(12) United States Patent
Oowada (10) Patent No.: US 9,574,866 B2
(45) Date of Patent: Feb. 21, 2017

(54) POSITION DETECTION DEVICE

(71) Applicant: DENSO CORPORATION, Kariya, Aichi-pref. (JP)

(72) Inventor: Takahumi Oowada, Kariya (JP)

(73) Assignee: DENSO CORPORATION, Kariya (JP)

( * ) Notice: Subject to any disclaimer, the term of this patent is extended or adjusted under 35 U.S.C. 154(b) by 985 days.

(21) Appl. No.: 13/845,603

(22) Filed: Mar. 18, 2013

(65) Prior Publication Data

US 2013/0257411 A1   Oct. 3, 2013

(30) Foreign Application Priority Data

Mar. 27, 2012   (JP) .................................. 2012-072039

(51) Int. Cl.
| | | |
|---|---|---|
| *G01D 3/032* | (2006.01) | |
| *G01B 7/14* | (2006.01) | |
| *G01D 5/20* | (2006.01) | |

(52) U.S. Cl.
CPC .................. *G01B 7/14* (2013.01); *G01D 3/032* (2013.01); *G01D 5/2073* (2013.01)

(58) Field of Classification Search
CPC .......... G01B 7/13; G01D 3/032; G01D 5/2073
USPC .............................. 332/145; 318/608; 702/94
See application file for complete search history.

(56) References Cited

U.S. PATENT DOCUMENTS

| | | | |
|---|---|---|---|
| 6,278,388 B1 | 8/2001 | Kushihara | |
| 2005/0033539 A1* | 2/2005 | Ishizuka ............ | G01D 5/24476 702/94 |
| 2010/0097052 A1 | 4/2010 | Lillestolen et al. | |
| 2012/0010849 A1 | 1/2012 | Yamada | |

FOREIGN PATENT DOCUMENTS

| | | |
|---|---|---|
| JP | 62-172218 | 7/1987 |
| JP | 11-118520 | 4/1999 |
| JP | 3442316 | 6/2003 |
| JP | 2006-023146 | 1/2006 |

(Continued)

OTHER PUBLICATIONS

Office Action (1 page) dated Feb. 18, 2014, issued in corresponding Japanese Application No. 2012-072039 and English translation (1 page).

(Continued)

*Primary Examiner* — Joseph Chang
(74) *Attorney, Agent, or Firm* — Nixon & Vanderhye P.C.

(57) ABSTRACT

In a position detection device, an amplitude modulation is executed for AC excitation signals Sc using modulation wave signals. Differential amplifiers execute a voltage conversion of the modulated wave signal Sin, Cos to digital data SIN, COS and transmit them to a microcomputer. The microcomputer multiplies the modulated wave signals SIN, COS with parameters cos $\varphi$, sin $\varphi$, and executes a subtraction of the multiplied value to obtain an error-correlation value $\epsilon$. An angle calculations section in the microcomputer receives a detected value $\epsilon c$ obtained by multiplying the error-correlation value $\epsilon$ with a binary detection signal Rd. The binary detection signal Rd corresponds to a positive sign or a negative sign of the signal Sc. It is adjusted that the sampling number of samples of the signal Rd corresponding to a positive value is equal to that corresponding to a negative value during one period of the signal Sc.

14 Claims, 7 Drawing Sheets

(56) References Cited

FOREIGN PATENT DOCUMENTS

| JP | 2010-096750 | 4/2010 |
| JP | 2011-141207 | 7/2011 |

OTHER PUBLICATIONS

Office Action (1 page) dated Nov. 4, 2014, issued in corresponding Japanese Application No. 2012-072039 and English translation (1 page).

* cited by examiner

PHASE OF AC EXCITATION SIGNAL Sc AT SAMPLING TIMING

PHASE OF AC EXCITATION SIGNAL Sc AT SAMPLING TIMING

POSITION DETECTION DEVICE

CROSS-REFERENCE TO RELATED APPLICATION

This application is related to and claims priority from Japanese Patent Application No. 2012-72039 filed on Mar. 27, 2012, the contents of which are hereby incorporated by reference.

BACKGROUND OF THE INVENTION

1. Field of the Invention

The present disclosure relates to position detection devices capable of receiving a modulated wave signal obtained by an amplitude modulation of an alternating current excitation signal (AC excitation signal) on the basis of position information of a target detection device, and demodulating the position information from the received modulated wave by using a plurality of sampling values of the modulated wave during one period of the AC excitation signal.

2. Description of the Related Art

For example, a patent document, Japanese patent JP 3442316 discloses a conventional resolver digital converter (RDC), as a position detection device of this type, capable of providing digital data regarding rotation detection angle information of a rotating device, which is a detection target, on the basis of modulated wave signals. These modulated wave signals are obtained by a resolver which executes an amplitude modulation of an excitation signal according to a rotation detection angle of the rotating device.

However, if the function of the position detection device is realized by using software programs, an operation speed of which is lower than an operation speed of a hardware device assembly, the inventors according to the present invention find that this structure using the software programs drastically decreases noise immunity.

SUMMARY

It is therefore desired to provide a position detection device having a structure capable of receiving a modulated wave, which is obtained by an amplitude modulation of an alternating current excitation signal on the basis of position information of a target detection device, and demodulating the position information from the modulated wave by using a plurality of sampling values of the modulated wave during one period of the alternating current excitation signal.

An exemplary embodiment provides a position detection device having a demodulation section. The demodulation section receives one or more modulated wave signals obtained by an amplitude modulation of an alternating current excitation signal Sc on the basis of position information of a target detection device to be detected. The demodulation section demodulates the position information from one or more the modulated wave signals by using a plurality of sampling values of the modulated wave signals during a period of the alternating current excitation signal. In particular, the demodulation section has a detection section and an imbalance avoidance section. The detection section receives the alternating current excitation signal and executes an eliminating process of eliminating an influence caused by a sign of the alternating current excitation signal from the modulated wave signals during the demodulation of the position information on the basis of one or more the modulated wave signals. The imbalance avoidance section avoids a generation of a difference between the sampling number of samples of the alternating current excitation signal having a positive sign and the sampling number of samples of the alternating current excitation signal having a negative sign during a predetermined period. In this case, the alternating current excitation signal is used for the demodulation of the position information of the target detection device.

The inventors according to the present invention find that a difference decreases or deteriorates the noise immunity in the execution of the demodulation of the position information. This difference is caused between the sampling number of samples of the alternating current excitation signal having a positive sign and the sampling number of samples of the alternating current excitation signal having a negative sign, where the alternating current excitation signal is used for demodulating position information from the demodulated wave signals. That is, the difference decreases or deteriorates the noise immunity in the execution of the demodulation of the position information. The position detection device according to the exemplary embodiment has the imbalance avoidance section in order to prevent the noise immunity of the position detection device from being decreased or deteriorated.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying

First Exemplary Embodiment

A description will be given of a position detection device according to the first exemplary embodiment with reference to FIG. 1 to FIG. 3. The first exemplary embodiment shows an example in which the position detection device is used in a resolver digital converter or a resolver digital encoder.

Figure 1:
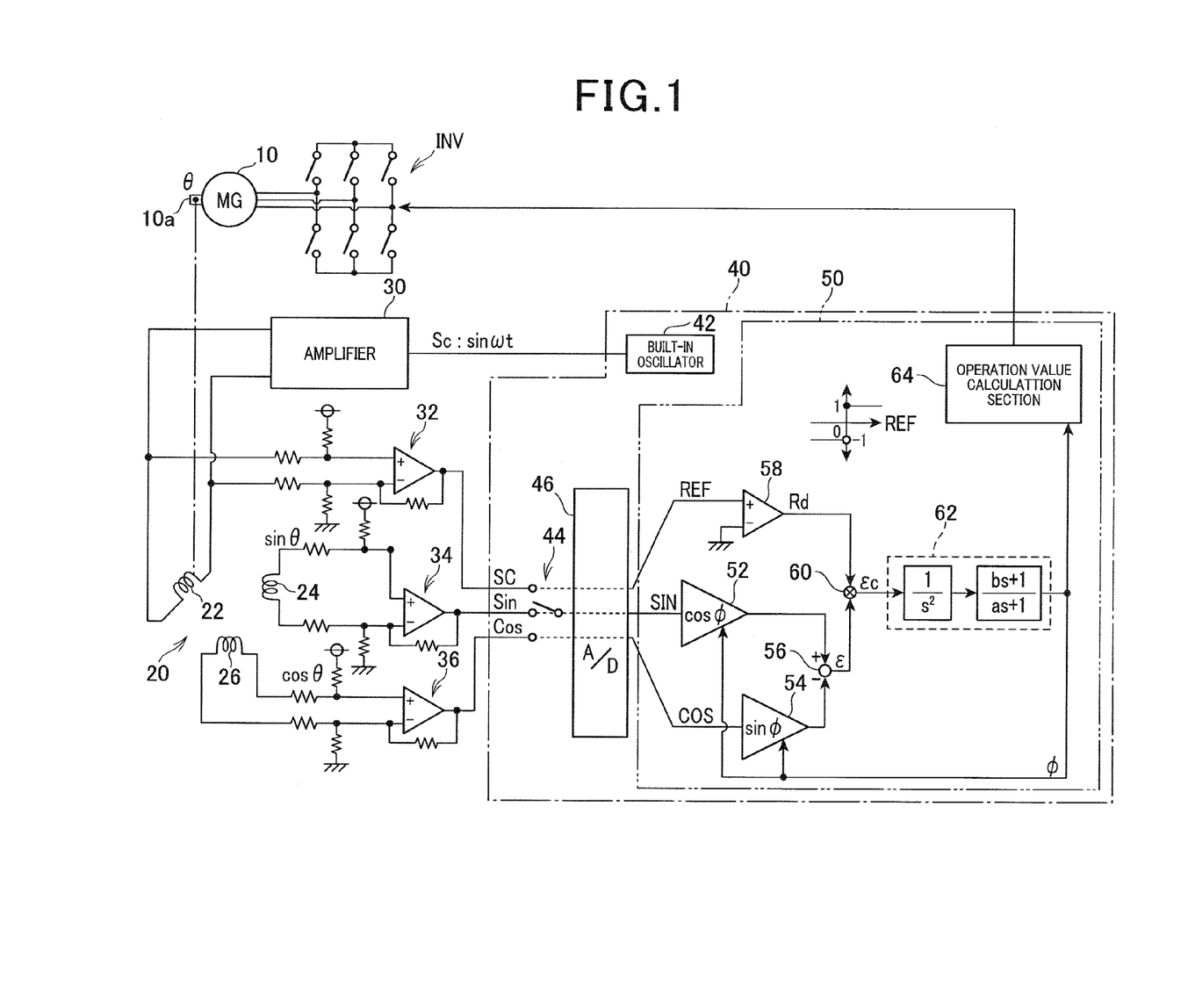
FIG. 1 is a view showing a configuration of a position detection device according to a first exemplary embodiment of the present invention.

FIG. 1 is a view showing a configuration of a position detection device according to the first exemplary embodiment. As shown in FIG. 1, a motor generator 10 mounted to a motor vehicle (not shown) is used as a main engine of the motor vehicle. The motor generator 10 is mechanically connected to a wheel shaft (not shown). An inverter INV transmits electric power between the motor generator 10 and a battery (not shown). A rotor 10a of the motor generator 10 is mechanically connected to a primary coil 22 of the resolver 20.

The primary coil 22 is excited by an alternating current (AC) excitation signal Sc having a sine curve transmitted from a microcomputer 40 with a built-in oscillator 42. In more detail, the AC excitation signal Sc is transmitted to an amplification circuit 30. When receiving and amplifying the AC excitation signal Sc, the amplification circuit 30 transmits the amplified AC excitation signal Sc to the primary coil 22.

Magnet flux generated in the primary coil 22 by the amplified AC excitation signal Sc is interlinked with a pair of secondary coils 24 and 26.

The primary coil 22 and the pair of the secondary coils 24 and 26 are configured to change a mutual inductance thereof periodically on the basis of an electric angle (a rotation angle θ, as position information) of the rotor 10a of the motor generator 10 as the detection target. This configuration makes it possible to periodically change the sampling number of magnetic fluxes interlinked to the secondary coils 24 and 26. In particular, the position detection device according to the first exemplary embodiment generates a voltage in the secondary coil 24 and a voltage in the secondary coil 26 so that a phase difference between the voltage generated in the secondary coil 24 and the voltage generated in the secondary coil 26 is shifted by π/2. This makes it possible for the output voltage of each of the secondary coils 24 and 26 to have a modulated wave signal obtained by modulating the AC excitation signal Sc by a modulation wave signal sin θ and a modulation wave signal cos θ, respectively. When the excitation signal Sc is sin ωt, the modulated wave signals of the secondary coils 24 and 26 can be expressed by sin θ·sin ωt and cos θ·cos ωt, respectively.

A differential amplification circuit 32 converts the outputs transmitted from the amplification circuit 30 to an input excitation signal SC. As shown in FIG. 1, an analogue to digital converter (AD converter) 46 receives the input excitation signal SC.

On the other hand, a differential amplification circuit 32 receives an output voltage of the secondary coil 24, and converts the received output voltage to a modulated wave signal Sin. A differential amplification circuit 36 receives an output voltage of the secondary coil 26, and converts the received output voltage to a modulated wave signal Cos. That is, the microcomputer 40 receives the input excitation signal SC, the modulated wave signal Sin and the modulated wave signal Cos. The AD converter 46 receives, in time division, respectively, under the control of a selector 44 in the microcomputer 40, the input excitation signal SC, the modulated wave signal Sin and the modulated wave signal Cos.

The AD converter 46 converts the received input excitation signal SC to digital data items (by sampling the AC excitation signal Sc) as reference signal REF. The AD converter 46 converts the received modulated wave signal Sin to digital data items (by sampling the modulated wave signal Sin) as the modulated wave signal SIN. Similarly, the AD converter 46 converts the received modulated wave signal Cos to digital data items (by sampling the modulated wave signal Cos) as the modulated wave signal COS.

A central processing unit (CPU) 50 receives the output signals transmitted from the AD converter 46. The programs stored in the CPU 50 processes the received input signals such as the reference signal REF, the modulated wave signal SIN and the modulated wave signal COS.

The block diagram of the CPU 50 shown in FIG. 1 shows a process of calculating a rotation detection angle θ of the rotor 10a of the motor generator 10.

That is, as shown in FIG. 1, a multiplier 52 multiplies a cosine function cos φ and the modulated wave signal SIN, where the cosine function cos φ uses a calculation value (calculated angle φ) of the rotation detection angle θ of the rotor 10a of the motor generator 10 as an independent variable.

On the other hand, a multiplier 54 multiplies a sine function sin φ and the modulated wave signal COS, where the sine function sin φ uses a calculation value (calculated angle φ) of the rotation detection angle θ of the rotor 10a of the motor generator 10 as an independent variable.

An error correlation calculation section 56 subtracts the output value of the multiplier 52 from the output value of the multiplier 54 in order to calculate an error correlation value ε.

The error correlation value ε can be expressed by the following equation (c1), neglecting a proportional coefficient determined by a gain of the differential amplification circuits 32, 24 and 36 and the amplification circuit 30:

$$\text{Error correlation value } \varepsilon = \sin\omega t \cdot \sin\theta \cdot \cos\Phi - \sin\omega t \cdot \quad (c1)$$
$$\cos\theta \cdot \sin\Phi$$
$$= \sin\omega t \cdot \sin(\theta - \Phi).$$

When a difference between the actual rotation detection angle θ of the rotor 10a of the motor generator 10 and the calculated angle φ becomes zero, the error correlation value ε becomes zero. In addition, when eliminating an influence caused by a magnitude of the AC excitation signal Sc, an absolute value of the error correlation value ε becomes a same value regardless of a sign of the AC excitation signal Sc so long as the absolute value of the error correlation value ε is changed according to a difference between the calculated angle φ and an actual rotation detection angle θ of the rotor 10a and the difference thereof has a same value. Still further, when eliminating an influence caused by a sign of the AC excitation signal Sc (a sign of sin ωt), the error correlation value ε is a variable indicating whether or not the calculated angle φ is an advance angle or a retard angle from a calculated angle φ. A process of eliminating such influence caused by a sign of the AC excitation signal Sc from the error correlation value ε is executed by a synchronous detection.

That is, the AD converter 46 transmits the reference signal REF to a detection signal generation section 58 as a binary detection signal calculation section. The detection signal generation section 58 generates a detection signal Rd having a value of 1 or −1 on the basis of a sign of the received reference signal REF. In more detail, the detection signal generation section 58 generates the detection signal Rd having a value of 1 when the received reference signal REF is not less than zero. Further, the detection signal generation section 58 generates the detection signal Rd having a value of −1 when the received reference signal REF is less than zero. On the other hand, a synchronous detection section 60 multiplies the error correlation value ϵ and the detection signal Rd in order to calculate a detected value ϵC.

The detected value ϵc is a parameter having a value of zero when a difference between the actual rotation detection angle θ of the rotor 10a and the calculated angle ϕ is zero. Further, the detected value ϵc is also a parameter indicating an advance angle or a retard angle on the basis of a sign of the difference between the actual rotation detection angle θ of the rotor 10a and the calculated angle ϕ.

An angle calculation section 62 receives the detected value ϵc transmitted from the synchronous detection section 60. In general, the angle calculation section 62 is comprised of a low pass filter and an integrating section. The first exemplary embodiment shown in FIG. 1 uses the angle calculation section 62 comprised of a double integral section ($1/s^2$) and a phase compensation filter (bs+1)/(as+1). The angle calculation section 62 uses the double integral section ($1/s^2$) because the calculated angle ϕ does not have a stationary error when the rotation detection angle θ of the rotor 10a is changed at a constant speed.

The calculated angle ϕ is also transmitted to an operation value calculation section 64 in addition to the multiplier 52 and the multiplier 54. The operation value calculation section 64 generates an operation signal on the basis of a current detection value of a current sensor (not shown) and the calculated angle ϕ. The current sensor (not shown) detects the current flowing in the motor generator 10. The operation value calculation section 64 outputs the operation signal to the inverter INV in order to adjust a control value (for example, an output torque) of the motor generator 10 to an instruction value indicated by the operation signal.

By the way, the inventors according to the present invention find the following drawbacks when the microcomputer 40 (namely, the CPU 50) acts as a calculation section to execute a control program in order to calculate the calculated angle ϕ, and when a calculation speed of the calculated angle ϕ is low.

In a first drawback, a detection error is caused where a sign of the detection signal Rd is different from a sign of the AC excitation signal Sc contained in the modulated wave signals SIN and COS. This error is caused by a difference in sampling times between the reference signal REF, the modulated wave signal SIN and the modulated wave signal COS because the AD converter 46 executes the sampling of, in time division, the input excitation signal SC, the modulated wave signal Sin and the modulated wave signal Cos.

In a second drawback, using the microcomputer 40 has low noise immunity because there is a difference between the sampling number of samples of the reference signal REF having a positive value and the sampling number of samples of the reference signal REF having a negative value during one sampling period. That is, the detected value ϵc has a value of K·|sin ωt|·sin (θ−ϕ) by using a proportional constant K (>0) which is determined by gains of the differential amplification circuits 32, 34 and 36. Accordingly, the calculated angle ϕ is not affected, as long as noises are added into the reference signal REF, from a matter due to a difference between the sampling number of samples of the reference signal REF having a positive value and the sampling number of samples of the reference signal REF having a negative value during one sampling period.

However, when noises are added into the signals supplied to the differential amplification circuit 36, and the noise is designated by an offset value δ, the detected value ϵc can be expressed by a following formula (c2):

$$\text{Detected value } \epsilon c = K \cdot |\sin \omega t| \cdot \sin(\theta - \phi) - \sin \phi \cdot \delta \cdot Rd / |Rd| \quad (c2).$$

The second right term in the formula (c2) is a value having a sign determined by the detection signal Rd. Accordingly, when a difference between the sampling number of samples of the detection signal Rd having a positive value and the sampling number of samples of the detection signal Rd having a negative value becomes zero during a noise added period, an average value of the second right term in the formula (c2) becomes zero. On the other hand, when the difference is not zero, namely, when the difference between the sampling number of samples of the detection signal Rd having a positive value and the sampling number of samples of the detection signal Rd having a negative value does not become zero, an average value of the second right term in the formula (c2) does not zero. In particular, because the first exemplary embodiment uses the angle calculation section 62 comprised of the double integral section ($1/s^2$), the interference caused by the difference of the sampling number of samples of the detection signal Rd is increased.

For example, when a calculation period of calculating the calculated angle ϕ (namely, the sampling period such as the reference signal REF, etc.) is fixed, and when the sampling number of samples of the detection signal Rd having a positive value is greater than the sampling number of samples of the detection signal Rd having a negative value, a phenomenon is caused later, in which when the sampling number of samples of the detection signal Rd having a negative value is greater than that of the detection signal Rd having a positive value. In this case, when the calculation period of calculating the calculated angle ϕ has a long time period, there is a possibility of having the difference of zero, namely, there is not caused an imbalance between the sampling number of samples of the detection signal Rd having a positive value and the sampling number of samples of the detection signal Rd having a negative value. This means that there is a presence of a time scale which affects the calculation accuracy of the calculated angle ϕ.

By the way, it is possible to adjust the time constant of the low pass filter of the phase compensation filter (bs+1)/(as+1) in the angle calculation section 62 in order to eliminate the interference caused by the presence of noises during this time scale. However, this makes it possible to decrease a responsiveness of the angle calculation section 62. Because a vehicle built-in device is required to have a high responsiveness, it is difficult to use the above measure to adjust the time constant of the low pass filter of the phase compensation filter (bs+1)/(as+1) in the angle calculation section 62.

When a calculation period (as the period of sampling the AC excitation signal Sc, etc.) of calculating the calculated angle ϕ, the noise immunity is decreased by the imbalance between the sampling number of samples of the detection signal Rd having a positive value and the sampling number of samples of the detection signal Rd having a negative value. In other words, when the calculation period of calculating the calculated angle ϕ becomes an adequately short time period, the second right term in the formula (c2) does not affect the accuracy of calculating the of calculating the calculated angle φ. For example, when the AC excitation signal Sc has a period of 100 μs and the period of calculating the calculated angle φ is a period of 6 μs, the sampling number of samples during a half period of the AC excitation signal Sc becomes 8 or 9. On the other hand, when the AC excitation signal Sc has a period of 100 μs and the period of calculating the calculated angle φ is a period of 0.6 μs, the sampling number of samples during a half period of the AC excitation signal Sc becomes 83 or 84. In both the cases, a difference in number between the reference signal REF having a positive value and the reference signal REF having a negative value becomes one (a value of 1). However, a calculation accuracy of calculating the calculated angle φ is greatly affected by such a value of 1 in both the cases.

Actually, the phenomenon causing the imbalance, namely the difference in number between the samples of the detection signal Rd having a positive value and the samples of detection signal Rd having a negative value, as previously described, is also generated in a conventional resolver digital converter (RDC) or a resolver digital encoder. The problem where the noise immunity caused by the imbalance is decreased or deteriorated is also generated when the position detection device according to the first exemplary embodiment uses software programs and the calculation period with a low frequency wave (for example, not more than 200 kHz) in order to calculate the calculated angle φ.

The inventors according to the present invention found the above problem during the evaluation of the noise immunity of a resolver digital encoder or a resolver digital converter using a calculation period with a low frequency wave.

Figure 2:
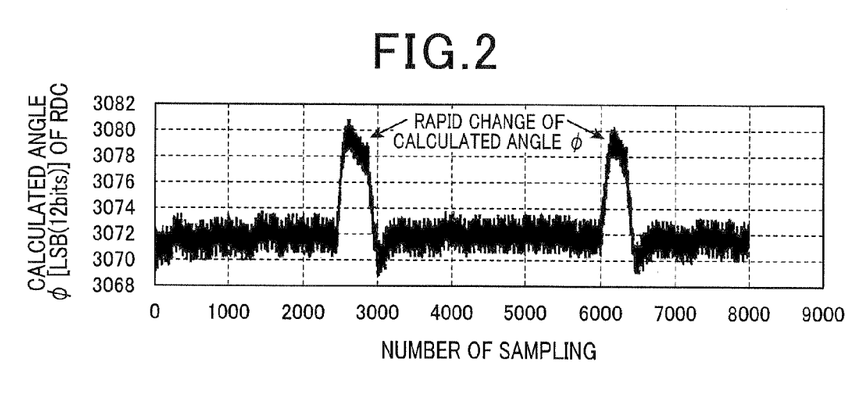
FIG. 2 is a view showing a timing chart of experimental results obtained by a conventional position detection device in order to find a principle for solving a problem caused by the position detection device.

FIG. 2 is a view showing a timing chart of experimental results obtained by a conventional position detection device in order to find a principle for solving the problem caused by such a conventional position detection device. That is, FIG. 2 shows the calculated angle φ of 12 bit data of a resolver digital converter (RDC) or a resolver digital encoder.

Specifically, when the rotor 10a of the motor generator 10 is stopped and an offset error value is added to the output of the differential amplification circuit 36, the calculated angle φ is suddenly changed. For example, a rapid change of the calculated angle φ is within a sample number range of 2000 to 3000 (see FIG. 2), and a sample number range of 6000 to 7000 (see FIG. 2). The inventors according to the present invention found that the phenomenon of the imbalance previously described, in addition to the phenomenon of the detection error, causes such a sudden change of the calculated angle φ in addition.

Figure 3:
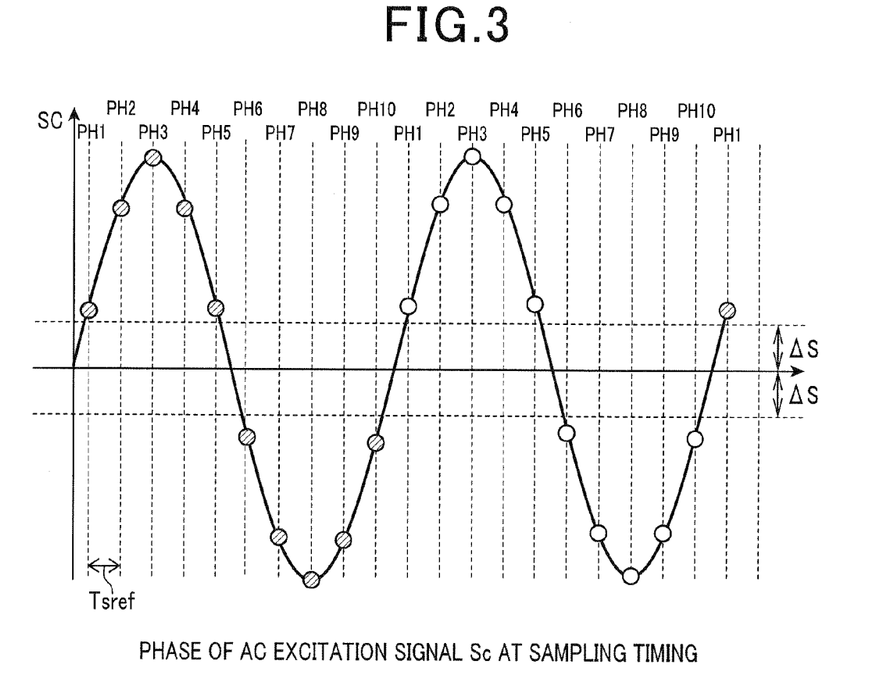
FIG. 3 is a view showing a timing chart of sampling excitation signals used by the position detection device according to the first exemplary embodiment of the present invention.

In order to solve the above problem caused by the phenomenon of the imbalance, the position detection device according to the first exemplary embodiment uses a sampling timing shown in FIG. 3.

FIG. 3 is a view showing a timing chart of sampling excitation signals used by the position detection device according to the first exemplary embodiment.

As shown in FIG. 3, the sampling time (or the sampling timing), at which the input excitation signal SC is sampled, is fixed to a reference sampling period Tsref, and a phase of the AC excitation signal Sc is adjusted by the first condition and the second condition as follows.

(First Condition)

In the first condition, the sampling number of samples during a period when the excitation signal SC has a positive value is equal to the sampling number of samples during a period when the input excitation signal SC has a negative value. In other words, it is controlled that the sampling number of samples during the positive period (namely, during phases PH1 to PH5 shown in FIG. 3) is equal to the sampling number of samples during the negative period (namely, during phases PH6 to PH10 shown in FIG. 3). The position detection device according to the first exemplary embodiment has an imbalance avoidance section which uses the first condition.

(Second Condition)

In the second condition, an absolute value of the input excitation signal SC to be sampled is not less than the predetermined value ΔS. The second condition is a condition to avoid a detection error. The predetermined value ΔS is a value which is more than a changed value of the input excitation signal SC during a time difference between the sampling time of the input excitation signal SC by the AD converter 46 and the sampling time of the modulated wave signals SIN and COS.

The second condition can be realized when a phase of the AC excitation signal Sc has a same value in a sampling time every one period of the AC excitation signal Sc by adjusting the reference sampling period Tsref and the sampling phase. That is, because the sampling phase (the phase of the AC excitation signal Sc at a sampling time) is changed according to a time elapse when the second condition is not satisfied, there is a possibility of the second condition being difficult to satisfy. The position detection device according to the first exemplary embodiment has a demodulation prohibition section and a timing setting section, each of which uses the second condition.

When the second condition is satisfied, it is possible to avoid an occurrence of the imbalance as previously described and to increase the noise immunity caused by various matters excepting the imbalance phenomenon. That is, because the detection signal Rd becomes a value of 1 when the AC excitation signal Sc is zero, the imbalance is easily generated by executing the sampling when the input excitation signal SC has a value of zero.

On the other hand, the demodulation prohibition section in the position detection device according to the first exemplary embodiment which satisfies the second condition prohibits the sampling of the input excitation signal SC when the input excitation signal SC has a value of zero. Although the reference signal REF has a sign opposite to the sign of the AC excitation signal Sc caused by noises, this is almost never occurs when a value of the input excitation signal SC is increased. Accordingly, satisfying the second condition can increase the noise immunity.

Second Exemplary Embodiment

A description will be given of the position detection device according to a second exemplary embodiment with reference to FIG. 4, FIG. 5 and FIG. 6.

The difference between the second exemplary embodiment and the first exemplary embodiment will be explained. The same components, action and effects between the second exemplary embodiment and the first exemplary embodiment are omitted here for brevity.

Figure 4:
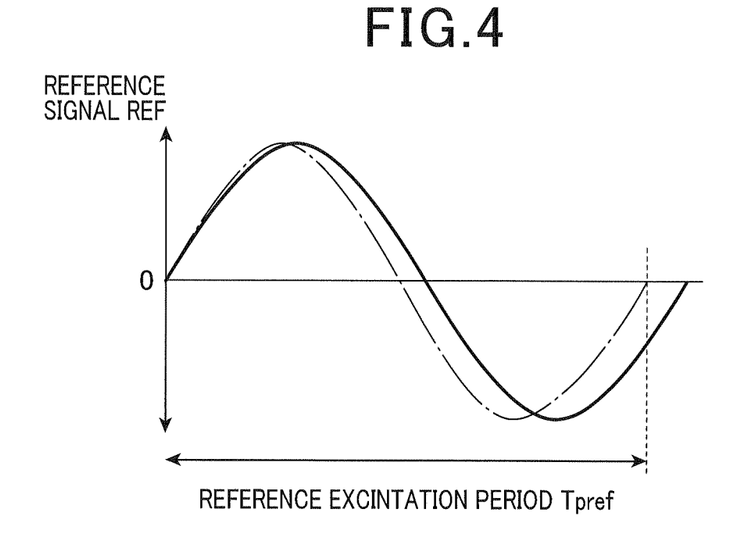
FIG. 4 is a view showing a timing chart of a problem to be solved by the position detection device according to a second exemplary embodiment.

FIG. 4 is a view showing a timing chart of a problem to be solved by the position detection device according to the second exemplary embodiment. By the way, FIG. 3 shows the period of the sampling time and the phase of the input excitation signal SC used by the position detection device according to the first exemplary embodiment. Using the period of the sampling time and the phase of the input excitation signal SC makes it possible to avoid occurrence of the imbalance and the detection error previously described.

When the period of the sampling time and the phase of the input excitation signal SC are fixed as shown in FIG. 4, it is difficult to obtain the effects because the period of the AC excitation signal Sc is fluctuated due to the ambient temperature, etc. This means that the phase of the input excitation signal SC becomes different from the phase shown in FIG. 3.

The position detection device according to the second exemplary embodiment solves this problem.

Figure 5:
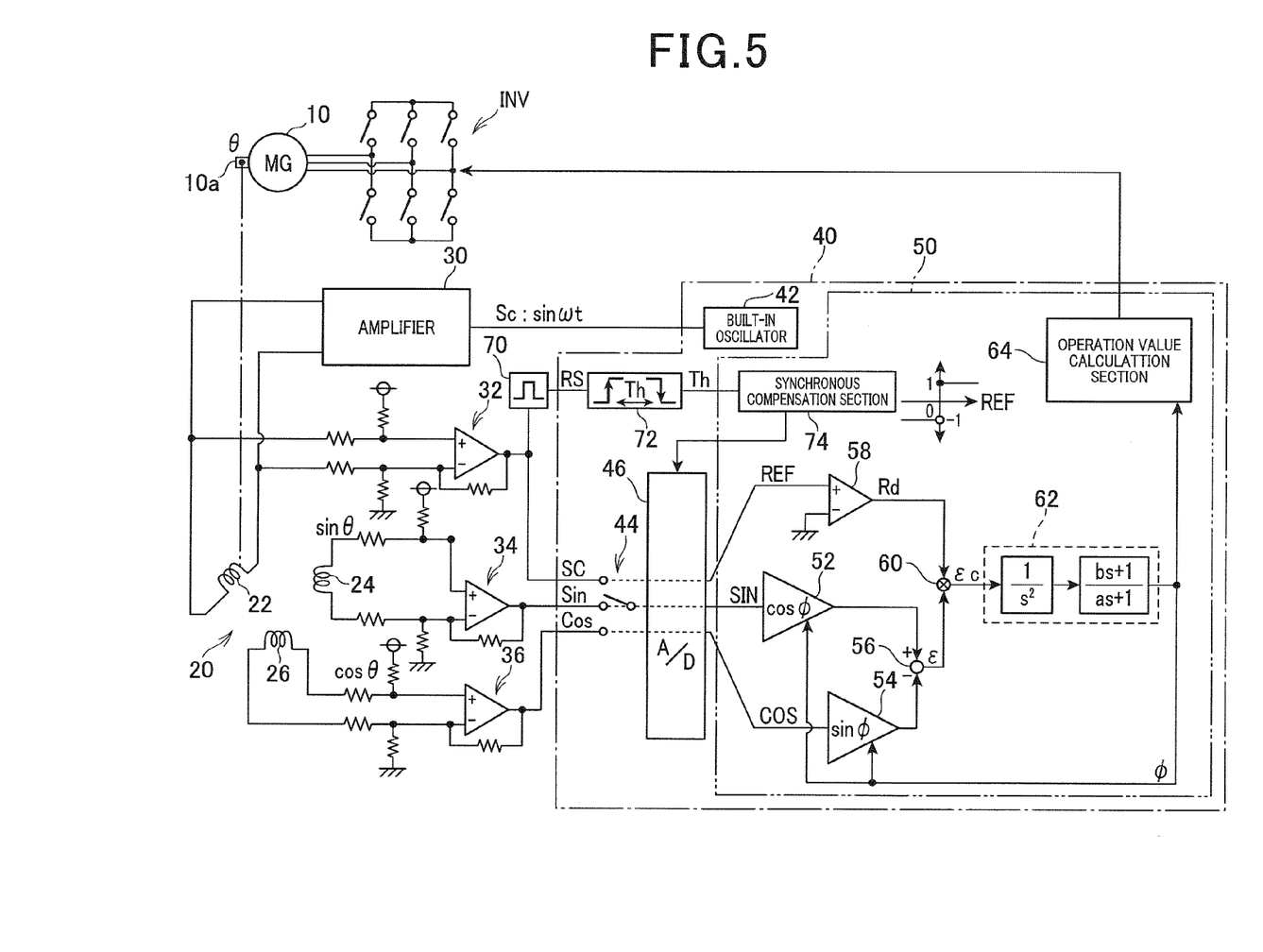
FIG. 5 is a view showing a configuration of a position detection device according to the second exemplary embodiment of the present invention.

FIG. 5 is a view showing a configuration of the position detection device according to the second exemplary embodiment. The same components between the first exemplary embodiment shown in FIG. 1 and the second exemplary embodiment shown in FIG. 5 are designated by the same reference numbers.

As shown in FIG. 5, a binary signal generation circuit 70 receives an output (as the input excitation signal SC) transmitted from the differential amplification circuit 32, and changes the received output to a binary signal RS. The binary signal RS is transmitted to the microcomputer 40. When receiving the binary signal RS transmitted from the binary signal generation circuit 70, a timer 72 in the microcomputer 40 detects a rising time Th of the binary signal RS. The CPU 50 receives the detected rising time Th. A synchronous compensation section 74 in the CPU 50 changes the sampling period executed by the AD converter 46 on the basis of the rising time Th.

Figure 6:
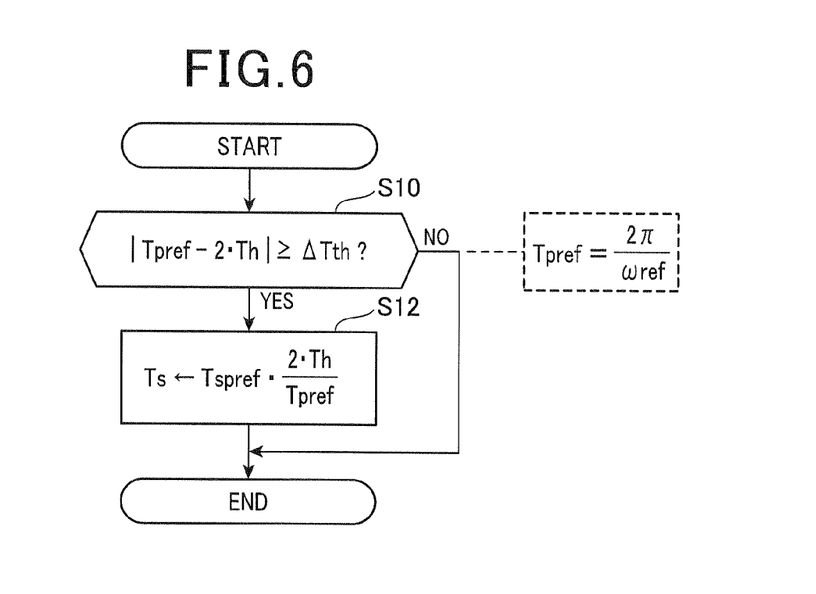
FIG. 6 is a view showing a flow chart of a process of changing a sampling period executed by the position detection device according to the second exemplary embodiment of the present invention.

FIG. 6 is a view showing a flow chart of the process which change the sampling period executed by the position detection device according to the second exemplary embodiment. That is, FIG. 6 shows the process of changing the sampling period Ts. The CPU 50 periodically executes the process shown in FIG. 6. The process shown in FIG. 6 corresponds to a sampling period changing section.

In step S10 shown in FIG. 6, the CPU 50 detects whether or not an absolute value of a difference between a reference excitation period Tpref of the AC excitation signal Sc and double the rising time Th is not less than a predetermined value. The detection in step S10 detects whether or not the excitation period of the AC excitation signal Sc is currently being changed. The reference excitation period Tpref is determined by an estimated angular speed (reference angular speed ωref) of the AC excitation signal Sc.

When the detection result in step S10 indicates affirmation ("YES" in step S10), the operation flow goes to step S12. In step S12, the CPU 50 changes the sampling period Ts using the following formula (c3).

$$Ts = Tsref \cdot 2 \cdot Th/Tpref \quad (c3),$$

where the reference sampling period Tref indicates an optimum period when the period of the AC excitation signal Sc is equal to the reference excitation period Tpref.

After the completion of step S12, or when the detection result in step S10 indicates negation ("NO" in step S10), the CPU 50 completes the execution of the process shown in FIG. 6.

According to the position detection device according to the second exemplary embodiment can avoid an occurrence of the imbalance previously described even if the period of the AC excitation signal Sc is changed.

Third Exemplary Embodiment

A description will be given of the position detection device according to a third exemplary embodiment with reference to FIG. 7 and FIG. 8.

Figure 7:
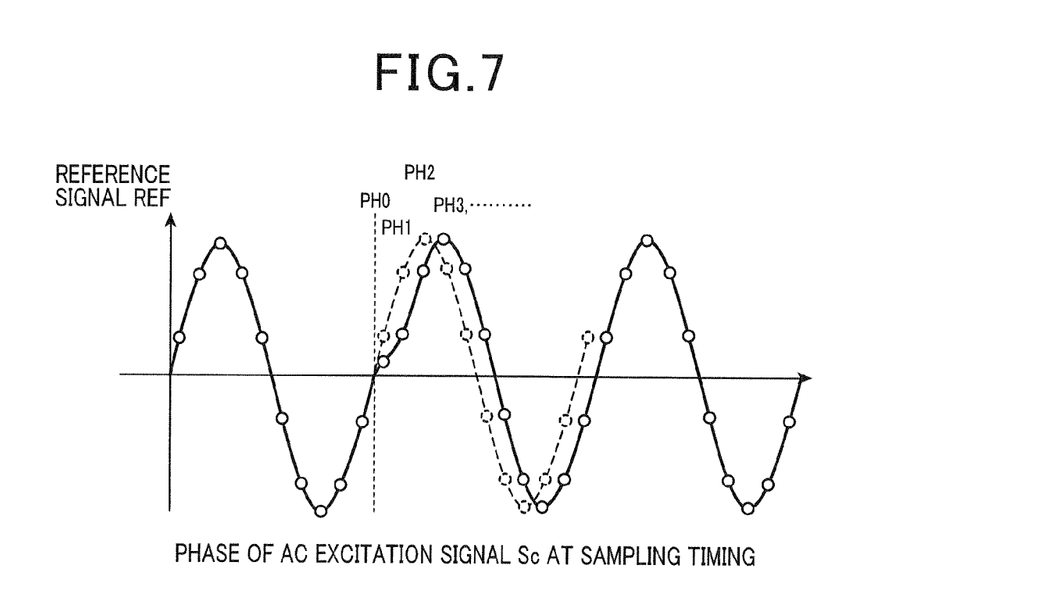
FIG. 7 is a view showing a timing chart of a problem to be solved by the position detection device according to a third exemplary embodiment.

FIG. 7 is a view showing a timing chart of a problem to be solved by the position detection device according to the third exemplary embodiment. FIG. 8 is a view showing a configuration of the position detection device according to the third exemplary embodiment.

As previously described, FIG. 3 shows the period of the sampling time and the phase of the input excitation signal SC used by the position detection device according to the first exemplary embodiment. Using the period of the sampling time and the phase of the input excitation signal SC makes it possible to avoid an occurrence of the imbalance and the detection error previously described. However, as shown in FIG. 7, when the phase of the AC excitation signal Sc is changed by some reason, it becomes difficult to avoid the occurrence of the imbalance and the detection error. This means that the phase of the input excitation signal SC at the sampling time (or the sampling timing) is shifted from the phase shown in FIG. 3. The third exemplary embodiment provides a measure to solve the problem.

Figure 8:
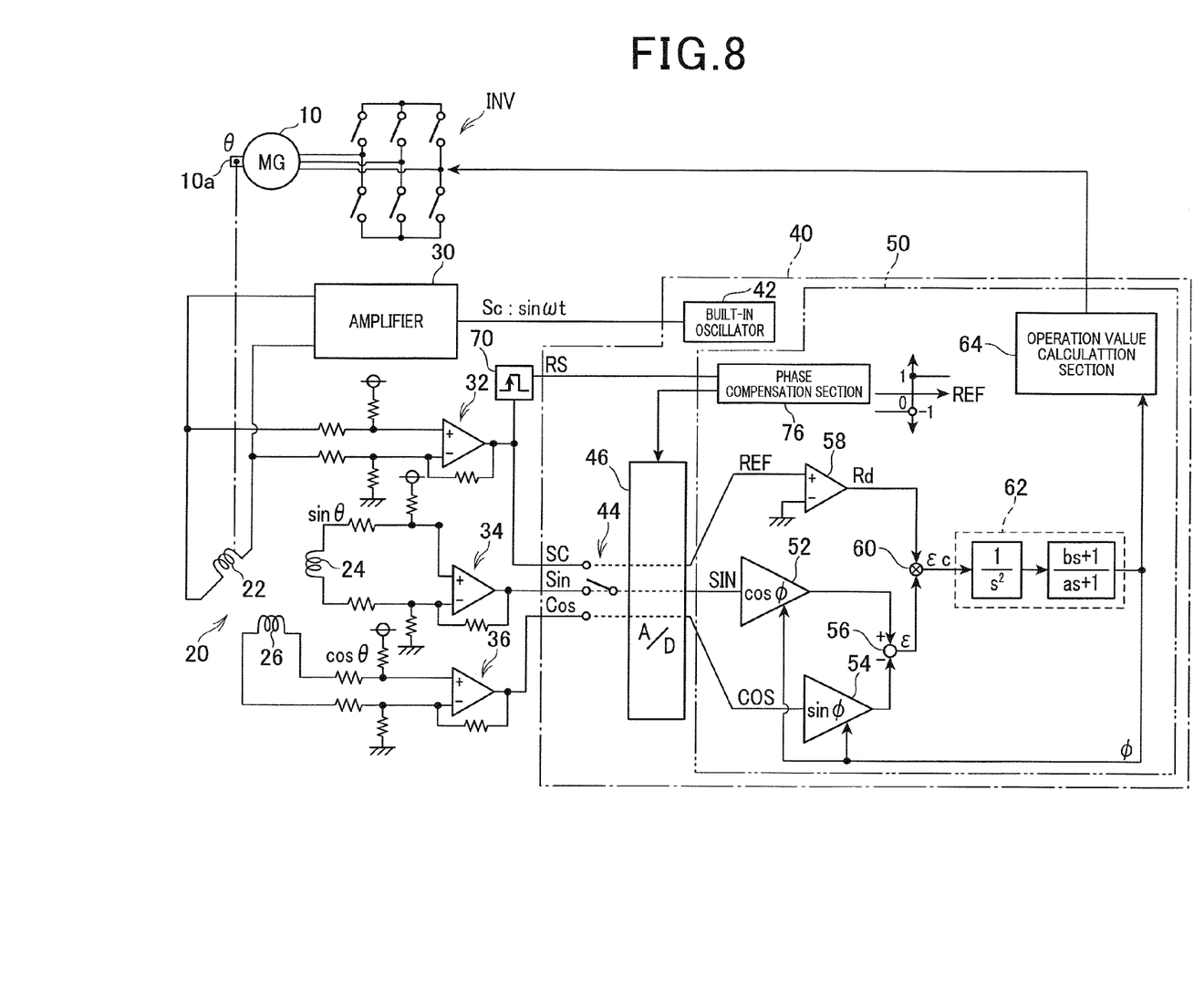
FIG. 8 is a view showing a configuration of a position detection device according to the third exemplary embodiment of the present invention.

FIG. 8 shows a structure of the position detection device according to the third exemplary embodiment. The difference between the third exemplary embodiment and the first exemplary embodiment will be explained. The same components, action and effects between the third exemplary embodiment and the first exemplary embodiment are omitted here for brevity.

As shown in FIG. 8, the binary signal generation circuit 70 receives an output (as the input excitation signal SC) transmitted from the differential amplification circuit 32, and changes the received output to a binary signal RS. The binary signal RS is transmitted to the microcomputer 40. When receiving the binary signal RS transmitted from the binary signal generation circuit 70, a phase compensation section 76 in the microcomputer 40 detects a rising edge of the binary signal RS. The CPU 50 receives the detection time of the rising edge. The phase compensation section 76 in the CPU 50 changes the sampling phase to be supplied to the AD converter 46 on the basis of the detection time of the rising edge. In more detail, the phase compensation section 76 in the CPU 50 changes the phase PH10 of the rising edge, and uses the sampling timing, which is an integer multiple of and at least twice the reference sampling period Tsref, counted from the time of the phase PH0, as the timing of PH1, Ph2, PH3, . . . .

The phase compensation section 76 in the CPU 50 forms a phase changing section.

Fourth Exemplary Embodiment

A description will be given of the position detection device according to a fourth exemplary embodiment with reference to FIG. 9.

Figure 9:
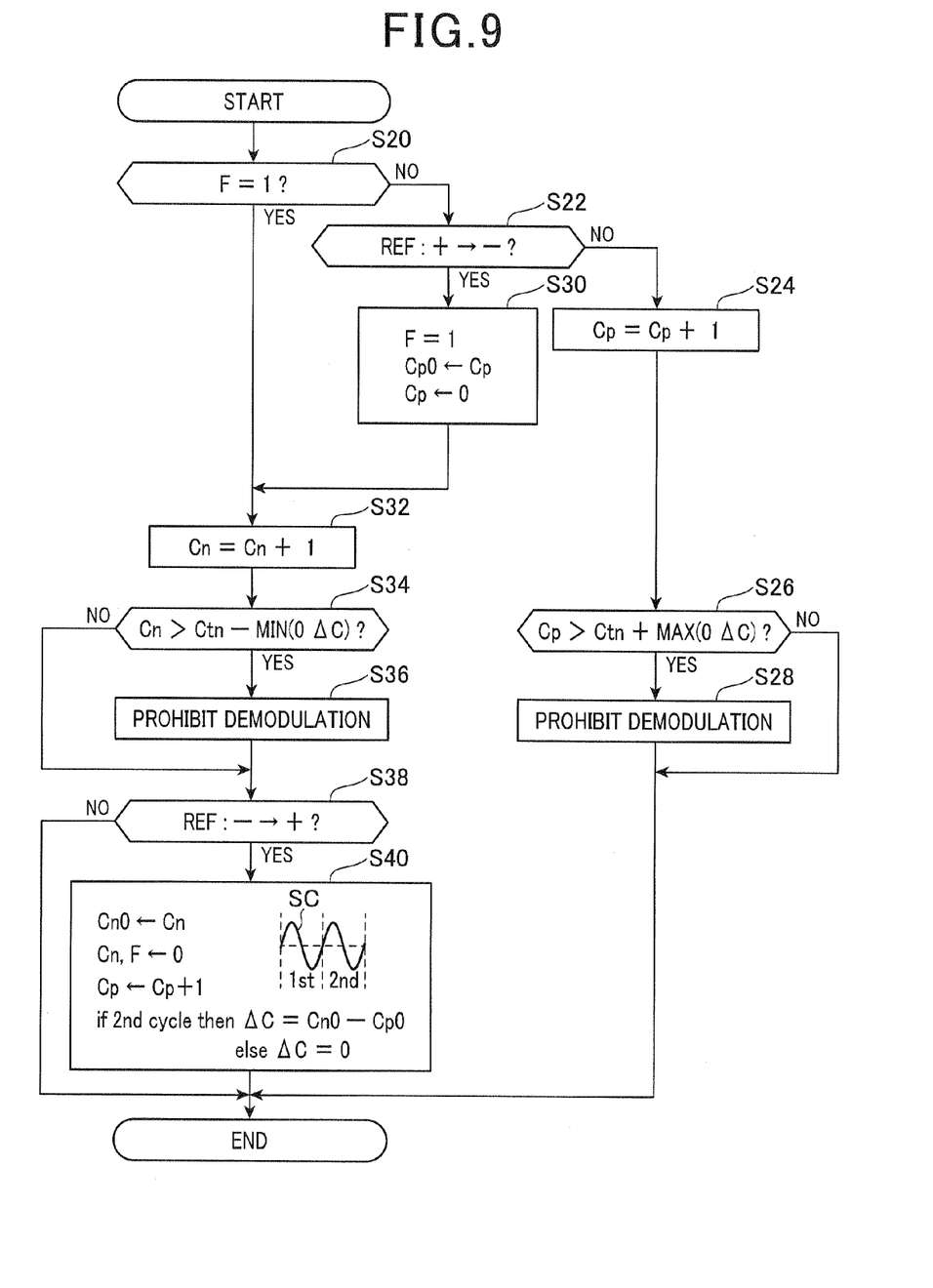
FIG. 9 is a view showing a flow chart of a process of chaining a period of a demodulation by the position detection device according to a fourth exemplary embodiment of the present invention.

FIG. 9 is a view showing a flow chart of a process of chaining a demodulation by the position detection device according to the fourth exemplary embodiment. The difference between the fourth exemplary embodiment and the first exemplary embodiment will be explained. The same components, action and effects between the fourth exemplary embodiment and the first exemplary embodiment are omitted here for brevity.

The fourth exemplary embodiment considers a condition in which the sampling number of samples of the reference signal REF having a positive sign becomes equal to the sampling number of samples of the reference signal REF having a negative sign during double periods of the AC excitation signal Sc.

The fourth exemplary embodiment considers a system in which an error generated in the calculated angle φ of the rotation detection angle θ of the rotor 10a of the motor generator 10 generated by the imbalance during one period of the AC excitation signal Sc does not exceed an allowable range. In more detail, when there is a difference between the sampling number of samples of the reference signal REF having a positive sign and the sampling number of samples of the reference signal REF having a negative sign during a first period in a pair of double periods of the AC excitation signal Sc, the CPU 50 changes an interval of demodulation (or the sampling number of samples) in the latter period (the second period) in the pair of the double periods of the AC excitation signal Sc.

The fourth exemplary embodiment uses the above process instead of the process disclosed in each of the second exemplary embodiment and the third exemplary embodiment.

FIG. 9 is a view showing the flow chart of the process of chaining the demodulation which is periodically executed by the CPU 50 in the position detection device according to the fourth exemplary embodiment. The process shown in FIG. 9 forms an interval changing section.

In step S20 shown in FIG. 9, the CPU 50 detects whether or not a flag F is a value of 1. The flag F having a value of 1 indicates that the reference signal REF is a negative value. If the detection result in step S20 indicates negation ("NO" in step S20), the operation flow goes to step S22. In step S22, the CPU 50 detects whether or not the reference signal REF is switched from a positive value to a negative value. When the detection result in step S22 indicates negation ("NO" in step S22), the operation flow goes to step S24. In step S24, the CPU 50 increments a counter value stored in a counter Cp. The counter Cp counts the sampling number of samples of the reference signal REF having a positive value. The operation flow goes to step S26.

In step S26, the CPU 50 detects whether or not the counter value of the counter Cp is greater than a value which is obtained by adding a reference number Cth and a predetermined value. The CPU 50 judges whether or not the demodulation is prohibited on the basis of the detection result in step S26. The predetermined value used in step S26 is a larger value in the compensation value ΔC and zero. The compensation value ΔC is determined so that the compensation value ΔC has a value other than zero in the second period (or the latter period) in a pair of double periods of the AC excitation signal Sc. When the detection result in step S26 indicates affirmation ("YES" in step S26), the operation flow goes to step S28.

In step S28, the CPU 50 prohibits the demodulation which uses the current reference signal REF. That is, the CPU 50 prohibits the change of an internal parameter used in the angle calculation section 62. The angle calculation section 62 executes an integration process using an integral element obtained for one sampling period Ts counted from a previously updating time.

On the other hand, when the detection result in step S22 indicates affirmative ("YES" in step S22), the operation flow goes to step S30. In step S30, the CPU 50 sets the flag F so that the flag F has a value of 1. The CPU 50 sets the counter Cp0 so that the counter Cp0 has a value of the counter Cp. Then, the CPU 50 sets the counter Cp so that the counter Cp has a value of zero. The operation flow goes to step S32.

In step S32, when the detection result in step S20 indicates affirmation ("YES" in step S20), the CPU 50 executes the increment of the value of the counter Cn by one. The counter Cn counts the sampling number of samples when the reference signal REF has a negative value in step S32. The operation flow goes to step S34.

In step S34, the CPU 50 detects whether or not the value of the counter Cn is larger than a value which is obtained by subtracting the reference number Cth by a predetermined value. The predetermined value used in step S34 is the larger of the compensation value ΔC and a value of zero. As previously described, the compensation value ΔC is determined so that the compensation value ΔC has a value other than zero in the second period (or the latter period) in a pair of double periods of the AC excitation signal Sc. When the detection result in step S34 indicates affirmation ("YES" in step S34), the operation flow goes to step S36.

In step S36, like the process in step S28, the CPU 50 prohibits the execution of the demodulation using the reference signal REF.

When the process in step S36 is completed, or when the detection result in step S34 indicates negation ("NO" in step S34), the operation flow goes to step S38. In step S38, the CPU 50 detects whether or not the reference signal REF is switched from a negative value to a positive value. When the detection result in step S38 indicates affirmation ("YES" in step S38), the operation flow goes to step S40.

In step S40, the CPU 50 sets the counter Cn so that the counter Cn has a value of the counter Cn0. Then, the CPU 50 sets the counter Cn and the flag F so that the counter Cn has a value of zero and the flag F has a value of zero. The CPU 50 increments the value of the counter Cp.

When the AC excitation signal Sc is in a second period, the CPU 50 sets the compensation value ΔC so that the compensation value ΔC has a value obtained by subtracting the value of the counter Cn0 from a value of the counter Cp0. When the AC excitation signal Sc is a value in the first period, the CPU 50 uses the compensation value ΔC of zero.

When the process in step S40, or the process in step S28 is completed, or when the detection result in step S38 or in step S26 indicates negation, the CPU 50 completes the process shown in FIG. 9.

(Other Modifications)

The concept of the present invention is not limited by the structure and process of the position detection device according to the first exemplary embodiment to the third exemplary embodiment previously described. For example, it is possible for the position detection device to have the following modifications.

(Binary Detection Signal Calculation Section as the Detection Signal Generation Section 58)

The detection signal generation section 58 in the position detection device according to the first to fourth exemplary embodiments calculates a binary detection signal R on the basis whether or not the AC excitation signal Sc is not less than zero. However, the concept of the present invention is not limited by this structure. For example, it is possible that the detection signal generation section 58 calculates the binary detection signal R on the basis whether or not the AC excitation signal Sc is more than zero.

(Detection Section as the Synchronous Detection Section 60)

The synchronous detection section 60 in the position detection device according to the first to fourth exemplary embodiment uses the detection signal Rd generated by the detection signal generation section 58 as the binary detection signal generation section. However, the concept of the present invention is not limited by this structure. For example, it is possible for the synchronous detection section 60 to use a detected value εc obtained by multiplying the reference signal REF by the error correlation value ε, and to eliminate an influence of a sign of the AC excitation signal Sc from the error correlation value ε.

(Synchronous Compensation Section 74)

In the position detection device according to the second exemplary embodiment shown in FIG. 5, the CPU 50 compensates the sampling period Ts on the basis of the detection result of the timer 72 (as the rising time Th of the binary signal RS). However, the concept of the present invention is not limited by this structure. For example, it is possible for the CPU 50 to adjust the sampling period Ts used in the AD converter 46 on the basis of the detection result of the rising time. That is, it is possible for the CPU 50 to adjust the sampling period Ts on the basis of a sum of the rising time and the falling time of the binary signal RS.

The second exemplary embodiment uses the software program of executing the function of the synchronous compensation section 74. However, the concept of the present invention is not limited by this structure. For example, it is possible to use a hardware device in order to realize the function of the synchronous compensation section 74. In other words, it is possible to have a structure in which such a hardware device changes or adjusts the sampling period of the AD converter 46.

(Phase Changing Section as the Phase Compensation Section 76)

The position detection device according to the third exemplary embodiment uses the CPU 50 to execute a software program in order to realize the function of the phase compensation section 76. However, the concept of the present invention is not limited by this structure. For example, it is possible to use a hardware device capable of changing the phase of the sampling phase used by the AD converter 46.

(Prediction Avoidance Section)

In the structure of the position detection device according to the second exemplary embodiment shown in FIG. 5, when the sampling period is fluctuated or changed, the sampling phase PHi is also shifted from a sampling phase before the occurrence of shifting the sampling phase. In this case, it is preferable for a prediction avoidance section to capable of adjusting both the sampling period Ts and the sampling phase. That is, it is preferable for the position detection device to have the prediction avoidance section comprising the sampling period changing section and the sampling phase changing section.

(Demodulation Prohibition Section)

The position detection device according to the third exemplary embodiment shown in FIG. 3 fixes the sampling period and the sampling phase of the input excitation signal SC, and has the demodulation prohibition section which prohibits the execution of the sampling of the input excitation signal SC when the absolute value of the input excitation signal SC is not more than the predetermined value ΔS. However, the concept of the present invention is not limited by this structure. For example, there is a possibility that the reference signal REF approaches the center value within a changed range at the sampling time corresponding to the phase PH4 shown in FIG. 3 when the period and/or the phase of the AC excitation signal Sc is changed. In this case, it is possible to have a section to prohibit the sampling of the input excitation signal SC when an absolute value of the input excitation signal SC is the predetermined value ΔS.

In addition to the process shown in FIG. 3 of prohibiting the conversion of the input excitation signal SC to the reference signal REF (namely, the sampling process), it is possible to prohibit using the detected value εc in the updating of the calculation value (calculated angle φ) of the rotation detection angle θ of the rotor 10a of the motor generator 10.

(Interval Changing Section)

When there is a difference between the sampling number of samples of the reference signal REF having a positive value and the sampling number of samples of the reference signal REF having a negative value during a first period in a pair of double periods of the AC excitation signal Sc, the CPU 50 changes the sampling number of samples in the latter period (or the second period) in the pair of the double periods of the AC excitation signal Sc. However, the concept of the present invention is not limited by this structure. For example, it is possible to limit the sampling number of samples in the third period in order to compensate the difference when there is a difference between the sampling number of samples of the reference signal REF having a positive value and the sampling number of samples of the reference signal REF having a negative value during a first period in a pair of double periods of the AC excitation signal Sc. In this case, it is preferable to use the position detection device having the above structure in a system in which an error does not exceed the allowable range of the calculated angle φ even if the imbalance of the reference signal REF during the double periods.

Further, the fourth exemplary embodiment limits the sampling number of samples when a sign of the AC excitation signal Sc becomes the sign of the reference REF having a large number of the sampling. However, the concept of the present invention is not limited by this structure. For example, it is possible to increase the sampling number of samples when a sign of the AC excitation signal Sc becomes a sign of the reference REF having a smaller number of the sampling.

Still further, it is possible to limit the sampling number of samples when the difference, between the sampling number of samples of the reference signal REF having a positive sign and the sampling number of samples of the reference signal REF having a negative sign, is generated during one period of the AC excitation signal Sc. This means that the sampling number of samples becomes four, not a five which is previously predicted, while the AC excitation signal Sc has a positive value in each of a period in which the AC excitation signal Sc has a positive value and a period in which the AC excitation signal Sc has a negative value. In this case, the sampling number of samples is switched from five to four during a period in which the AC excitation signal Sc has a negative value, and the fifth sampling is prohibited, or the demodulation using the result of the fifth sampling is prohibited.

(Imbalance Avoidance Section)

The first exemplary embodiment uses the imbalance avoidance section using the reference sampling period Tsref only. However, the concept of the present invention is not limited by this structure. For example, it is possible to use another sampling period, a time interval of which is changed in time during one period of the AC excitation signal Sc. In this case, it is possible to increase the sampling number of samples during a period in which an absolute value of the AC excitation signal Sc is large. Further, it is possible to increase the frequency of sampling when the AC excitation signal Sc has a small value in a region which exceeds the predetermined value ΔS in order to avoid decreasing the sampling number of samples when the AC excitation signal Sc approaches a value of zero.

The first exemplary embodiment uses the first condition, as previously described. That is, during one period of the AC excitation signal Sc, the first condition indicates that the sampling number of samples during a period when the AC excitation signal Sc (or the input excitation signal SC) has a positive value is equal to the sampling number of samples during a period when the AC excitation signal Sc (or the input excitation signal SC) has a negative value. However, the concept of the present invention is not limited by this structure. For example, it is possible to use plural periods other than one period, in which the sampling number of samples when the AC excitation signal Sc (or the input excitation signal SC) has a positive value is equal to the sampling number of samples when the AC excitation signal Sc (or the input excitation signal SC) has a negative value. That is, it is possible to adjust a calculation error of the calculated angle $\phi$ within a desired allowable range by selecting the period of sampling on the basis of a desired accuracy of the calculated angle $\phi$. It is possible to use a period other than integer times of one period of the AC excitation signal Sc (or the input excitation signal SC).

When the sampling period is used as a fixed value (such as the reference sampling period Tsref) in order to avoid an occurrence of imbalance during a period which is longer than one period of the AC excitation signal Sc, it is preferable to use a condition in which the AC excitation signal Sc has a same phase at a sampling time every predetermined period. This makes it possible to specify the phase of the AC excitation signal Sc corresponding to the sampling time during the to predetermined period, and to avoid that an absolute value of the input excitation signal SC is not more than the predetermined value $\Delta S$ at each sampling time.

It is not always necessary to avoid a sampling time at which an absolute value of the input excitation signal SC is not more than the predetermined value $\Delta S$. That is, under a condition in which the AC excitation signal Sc is contained in a modulated wave signal SIN or a modulated wave signal COS synchronized with the sampling, and a sign of the AC excitation signal Sc has a positive value after the sampling is executed at a time immediately before the input excitation signal SC is switched to a positive value, there is a possibility to eliminate or suppress an influence caused by a detection error when a sign of the AC excitation signal Sc contained in a modulated wave signal SIN or a modulated wave signal COS is switched to a negative sign where the modulated wave signal SIN or the modulated wave signal COS is synchronized with a time immediately before the input excitation signal SC is switched to a negative value.

(Analogue to Digital Converter)

The first to fourth exemplary embodiments use the AD converter 46 to convert the modulated wave signal SIN, the modulated wave signal COS and the input excitation signal SC to digital data items. However, the concept of the present invention is not limited by this structure. It is possible to use plural conversion sections, for example, one conversion section converts the modulated wave signal SIN and the modulated wave signal COS to digital data items, and another conversion section converts the input excitation signal SC to digital data items. Instead of this example, it is also possible to use three conversion sections which convert the modulated wave signal SIN, the modulated wave signal COS and the input excitation signal SC, respectively. In other words, it is possible that the excitation signal sampling section and the modulated wave sampling section use different analogue to digital converters, respectively.

(Demodulation Section)

(a) Error Correlation Value $\epsilon$

The position detection device according to the first exemplary embodiment having a structure shown in FIG. 1 uses the error correlation value $\epsilon$ having a sign, from which an influence caused by a sign of the AC excitation signal Sc is eliminated, and the sign of the error correlated value $\epsilon$ corresponds to a shifted direction of the calculated angle $\phi$ against the rotation detection angle $\theta$ of the rotor 10*a* of the motor generator 10. However, the concept of the present invention is not limited by this structure. For example, it is possible to use a value which is a sum of a first value and a second value where the first value is obtained by multiplying the modulated wave signal COS with cos ($\phi-\pi/2$), and the second value is obtained by multiplying the modulated wave signal SIN with sin ($\phi-\pi/2$). In this case, the error correlation value $\epsilon$ becomes a value which is proportional to sin $\omega t$ cos ($\theta-\phi+\pi/2$). Because of being free from the influence caused by a sign of the excitation signal sin $\omega t$, the error correlation value $\epsilon$ becomes a positive value when the calculated angle $\phi$ is advanced from the rotation detection angle $\theta$, and the error correlation value $\epsilon$ becomes a negative value when the calculated angle $\phi$ is retarded or delayed from the rotation detection angle $\theta$.

When an influence caused by a sign of the AC excitation signal Sc is eliminated from the error correlation value $\epsilon$, it is not always necessary for the error correlation value $\epsilon$ to have a sign corresponding to a direction of the calculated angle calculated angle $\phi$ against the rotation detection angle $\theta$ of the rotor 10*a* of the motor generator 10. For example, it is possible to obtain the error correlation value $\epsilon$ by adding a first value and a second value where the first value is obtained by multiplying the modulated wave signal COS with cos ($\phi-\pi/4$) and the second value is obtained by multiplying the modulated wave signal SIN with sin $\omega t$ con ($\theta-\phi+\pi/4$). In this case, the error correlation value $\epsilon$ becomes a value which is proportional to sin $\omega t$ cos ($\theta-\phi+\pi/4$). Even if the error correlation value $\epsilon$ is eliminated from the influence caused by a sign of the excitation signal Sc, the error correlation value $\epsilon$ does not have a sign corresponding to one of an advanced direction and a retarded direction of the calculated angle $\phi$ against the rotation detection angle $\theta$ of the rotor 10*a*.

However, when a control error is determined on the basis of a difference between the detected value $\epsilon c$ and $K/\sqrt{2}$ (where the influence caused by a sign of the AC excitation signal Sc is eliminated from the detected value $\epsilon c$, and K is an amplitude of the modulated wave signal determined by a gain of the differential amplifier circuit 34, etc.), the control error becomes a value having a sign corresponding to the direction to which the calculated angle $\phi$ is shifted from the rotation detection angle $\theta$ of the rotor 10*a* of the motor generator 10. It is therefore possible to calculate the calculated angle $\phi$ as an operation value of the feedback control for the control error to be made zero. In this case, it is effective to use the imbalance avoidance section in order to increase the noise immunity.

However, the above measure indicates how to define the error correlation value $\epsilon$ only. That is, if the value of $\epsilon-K$ sin $\omega t/\sqrt{2}$ is used as the error correlation value $\epsilon$, the value of $\epsilon-K$ sin $\omega t/\sqrt{2}$ becomes a value having a sin corresponding to the direction of the calculated angle $\phi$ shifted from the rotation detection angle $\theta$ of the rotor 10*a* of the motor generator 10 when the influence caused by the sign of the AC excitation signal Sc is eliminated from the error correlation value $\epsilon$.

The value obtained by eliminating the influence caused by an absolute value of the AC excitation signal Sc from the value of $\epsilon-K$ sin $\omega t/\sqrt{2}$ corresponds to a difference between the rotation detection angle $\theta$ and the calculated angle $\phi$. However, this value has a different absolute value when the calculated angle φ is an advanced angle or a retarded angle even if having a same error value. Because a gain used in the feedback control of the calculated angle φ becomes a different value in an advanced angle and a retarded angle, it is preferable to use the position detection device according to the exemplary embodiments in a system which allows this difference of the gain.

(b) Process of Calculating Calculated Angle φ

The concept of the present invention is not limited by the process of inputting the detected value εc and outputting the calculated angle φ previously described. It is possible to execute a process using three or more integral sections. For example, three integral sections execute a calculation of triple integrals.

Further, it is possible to have a single integral section. In this case, when there is a difference between the sampling number of samples of the reference signal REF having a positive sign and the sampling number of samples of the reference signal REF having a negative sign during a some period of the AC excitation signal Sc, the influence caused by noises is more increased according to the decreasing of the sampling number of samples. That is, the interval of the execution of the integral process is increased when the frequency of sampling is decreased, and a magnitude of the influence of noises to the calculated angle φ (namely, the gain of the calculated angle φ against noises) is increased.

(c) Structure of the Position Detection Device

The position detection device according to the first to fourth exemplary embodiments uses the CPU 50 which executes software programs in order to realize the various functions previously described. However, the concept of the present invention is not limited by this structure. For example, it is possible to use hardware devices to realize those functions because there is no difference in use between the software programs and the hardware devices from a point of view in which the noise immunity is decreased or deteriorated by a difference between the sampling number of samples when the excitation signal Sc has a positive sign and the sampling number of samples when the excitation signal Sc has a negative sign when the frequency of sampling of the input excitation signal SC to be used for demodulation is decreased.

(Target in Position Detection)

The first to fourth exemplary embodiments detect a position of the rotation detection angle of the rotor 10a of the motor generator 10. However, the concept of the present invention is not limited by this structure. For example, it is possible for the position detection device according to the present invention to detect various target position so long as the amplitude modulation of the excitation signal can be executed on the basis of position information.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A position detection device comprising:
a computer system, including a central processing unit (CPU), the computer system being configured to provide a demodulation section for receiving a modulated wave signal obtained by an amplitude modulation of an alternating current excitation signal on the basis of a position information of a target detection device to be detected, and demodulating the position information from the modulated wave signal by using a plurality of sampling values of one or more the modulated wave signal during a period of the alternating current excitation signal, wherein
the demodulation section comprising:
a detection section configured to receive the alternating current excitation signal and execute an eliminating process of eliminating an influence caused by a sign of the alternating current excitation signal from the modulated wave signal during the demodulation of the position information on the basis of one or more the modulated wave signal; and
an imbalance avoidance section configured to avoid a generation of a difference between the sampling number of samples of the alternating current excitation signal having a positive sign and the sampling number of samples of the alternating current excitation signal having a negative sign during a predetermined period, where the alternating current excitation signal is used for the demodulation of the position information of the target detection device.

2. The position detection device according to claim 1, wherein the imbalance avoidance section comprises a prediction avoidance section configured to avoid a difference, which is predicted, occurring between the sampling number of samples of the alternating current excitation signal having a positive sign and the sampling number of samples of the alternating current excitation signal having a negative sign during a predetermined period.

3. The position detection device according to claim 2, wherein the detection section comprises an alternating current excitation signal sampling section configured to execute a periodic sampling of the alternating current excitation signal,
the imbalance avoidance section determines the sampling period and the sampling phase of the alternating current excitation signal so that the period in which the alternating current excitation signal having a positive value and the period in which the alternating current excitation signal having a negative value have the same number of sampling, and
the prediction avoidance section comprises a sampling period changing section configured to receive the alternating current excitation signal, and changing the sampling period of the alternating current excitation signal sampling section on the basis of a fluctuation of the period of the received alternating current excitation signal.

4. The position detection device according to claim 2, wherein the detection section comprises an alternating current excitation signal sampling section configured to execute a periodic sampling of the alternating current excitation signal,
the imbalance avoidance section determines the sampling period and the sampling phase so that the period in which the alternating current excitation signal having a positive value and the period in which the alternating current excitation signal having a negative value have the same number of sampling, and
the imbalance avoidance section comprises a sampling phase changing section configured to receive the alternating current excitation signal, and to change the sampling phase of the alternating current excitation signal sampling section on the basis of the fluctuation of the phase of the received alternating current excitation signal.

5. The position detection device according to claim 2, wherein the detection section comprises:
an alternating current excitation signal sampling section configured to execute a sampling of the alternating current excitation signal; and
a binary detection signal calculation section configured to calculate a binary detection signal on the basis of one of:
whether or not a value of the alternating current excitation signal is not less than zero; and
whether or not a value of the alternating current excitation signal is more than zero,
the detection section executes the eliminating process by using the binary detection signal calculated by the binary detection signal calculation section, and
the prediction avoidance section comprises a demodulation prohibition section configured to prohibit the demodulation to be executed on the basis of the sampling of the alternating current excitation signal when the alternating current excitation signal has a value of zero.

6. The position detection device according to claim 2, wherein the detection section comprises an alternating current excitation signal sampling section configured to execute a sampling of the alternating current excitation signal, and
the prediction avoidance section comprises a sampling period changing section configured to instruct the demodulation section to change an interval of the execution of the demodulation when it is predicted to cause a difference between the sampling number of samples of the alternating current excitation signal having a positive sign and the sampling number of samples of the alternating current excitation signal having a negative sign, where the alternating current excitation signal is used to demodulate the position information thereof during a predetermined period.

7. The position detection device according to claim 6, wherein
when it is judged that a difference is generated between the sampling number of samples of the alternating current excitation signal having a positive sign and the sampling number of samples of the alternating current excitation signal having a negative sign, where the alternating current excitation signal is used to demodulate the position information thereof during a period which is shorter than the predetermined period, and
the sampling period changing section executes one of
(a) a process of decreasing the sampling number of samples during the execution of the demodulation of the alternating current excitation signal having a greater number of a sign, and
(b) the sampling period changing section executes a process of increasing the sampling number of samples during the execution of the demodulation of the alternating current excitation signal when the number of the samples having one sign is smaller than the number of the samples having another sign.

8. The position detection device according to claim 1, wherein the detection section comprises an alternating current excitation signal sampling section configured to execute a sampling of the alternating current excitation signal,
the imbalance avoidance section comprises a timing setting section configured to determine a timing of the alternating current excitation signal sampling section so that the sampling number of samples of the alternating current excitation signal is equal to each other between a one period in which the alternating current excitation signal has a positive value and another period in which the alternating current excitation signal has a negative value.

9. The position detection device according to claim 3, wherein the alternating current excitation signal sampling section periodically executes the sampling of the alternating current excitation signal.

10. The position detection device according to claim 3, wherein the imbalance avoidance section determines the sampling phase in order to eliminate a timing, at which an absolute value of the alternating current excitation signal is not more than a predetermined value, from the sampling time of the alternating current excitation signal.

11. The position detection device according to claim 1, wherein the detection section comprises an alternating current excitation signal sampling section configured to execute a sampling of the alternating current excitation signal, and
the position detection device further comprises a demodulation prohibition section configured to prohibit an execution of the demodulation by using the alternating current excitation signal obtained by the sampling of the alternating current excitation signal sampling section when the an absolute value of the alternating current excitation signal is not more than a predetermined value.

12. The position detection device according to claim 1, wherein the demodulation section is a software program execution section configured to execute a software program in order to realize the function of the demodulation section.

13. The position detection device according to claim 12, wherein the demodulation section comprises:
an alternating current excitation signal sampling section configured to execute a sampling of the alternating current excitation signal; and
a modulated wave signal sampling section configured to executes a sampling of the modulated wave signal,
wherein the alternating current excitation signal sampling section and the modulated wave signal sampling section in the demodulation section is realized by an analogue to digital conversion section configured to convert one or more the modulated wave signal and the alternating current excitation signal to digital data items in time division.

14. The position detection device according to claim 1, wherein the detection section comprises a binary detection signal calculation section configured to calculate a binary detection signal corresponding whether or not the alternating current excitation signal has a positive value or a negative value, and the detection section executes the eliminating process on the basis of the calculated binary detection signal.

* * * * *